(12) United States Patent
Müller

(10) Patent No.: US 9,751,669 B2
(45) Date of Patent: Sep. 5, 2017

(54) HOSE CLAMP

(71) Applicant: OETIKER SCHWEIZ AG, Horgen (CH)

(72) Inventor: Manuel Müller, Staffeln (CH)

(73) Assignee: OETIKER SCHWEIZ AG (CH)

( * ) Notice: Subject to any disclaimer, the term of this patent is extended or adjusted under 35 U.S.C. 154(b) by 0 days.

(21) Appl. No.: 15/114,905

(22) PCT Filed: Jan. 7, 2015

(86) PCT No.: PCT/EP2015/050152
§ 371 (c)(1),
(2) Date: Jul. 28, 2016

(87) PCT Pub. No.: WO2015/128100
PCT Pub. Date: Sep. 3, 2015

(65) Prior Publication Data
US 2016/0340093 A1 Nov. 24, 2016

(30) Foreign Application Priority Data
Feb. 28, 2014 (EP) ..................... 14157331

(51) Int. Cl.
*B65D 63/00* (2006.01)
*F16L 33/035* (2006.01)

(52) U.S. Cl.
CPC ............ *B65D 63/00* (2013.01); *F16L 33/035* (2013.01); *B65D 2563/00* (2013.01)

(58) Field of Classification Search
CPC ... Y10T 24/14; Y10T 24/141; Y10T 24/1457; Y10T 24/1478; Y10T 24/1482; Y10T 24/1498; B65D 63/00; B65D 63/02; B65D 63/04; B65D 63/06; F16L 33/02; F16L 33/025; F16L 33/035
See application file for complete search history.

(56) References Cited

U.S. PATENT DOCUMENTS

| | | | |
|---|---|---|---|
| 1,804,725 A | 5/1931 | Walker | |
| 3,078,532 A | 2/1963 | Bywater | |
| 3,293,709 A | 12/1966 | Holton | |
| 4,053,965 A | 10/1977 | Marchou | |
| 4,299,012 A | 11/1981 | Oetiker | |
| 4,468,840 A | 9/1984 | Sauer et al. | |
| 4,712,278 A | 12/1987 | Oetiker | |
| 2014/0215768 A1* | 8/2014 | Miessmer | F16L 33/035 24/274 R |

FOREIGN PATENT DOCUMENTS

| | | | | |
|---|---|---|---|---|
| CH | WO 2013034162 A1 * | 3/2013 | ............ | F16L 33/035 |
| DE | 7210034 U | 7/1972 | | |
| DE | 3050763 C2 * | 10/1984 | .......... | B25B 25/005 |
| WO | 2013060346 A1 | 5/2013 | | |

OTHER PUBLICATIONS

Search Report and Written Opinion for International Patent Application No. PCT/EP2015/050152; Jun. 25, 2015.

* cited by examiner

*Primary Examiner* — Abigail Troy
(74) *Attorney, Agent, or Firm* — Barnes & Thornburg LLP

(57) ABSTRACT

In an open hose clamp, the end of the outer one of the mutually overlapping clamping band portions terminates in a tongue. For tightening the clamp, the tongue has a toothed region which cooperates with a toothed region on the inner clamping band portion. The inner clamping band portion has with guide brackets that surround the tongue at least in part.

10 Claims, 4 Drawing Sheets

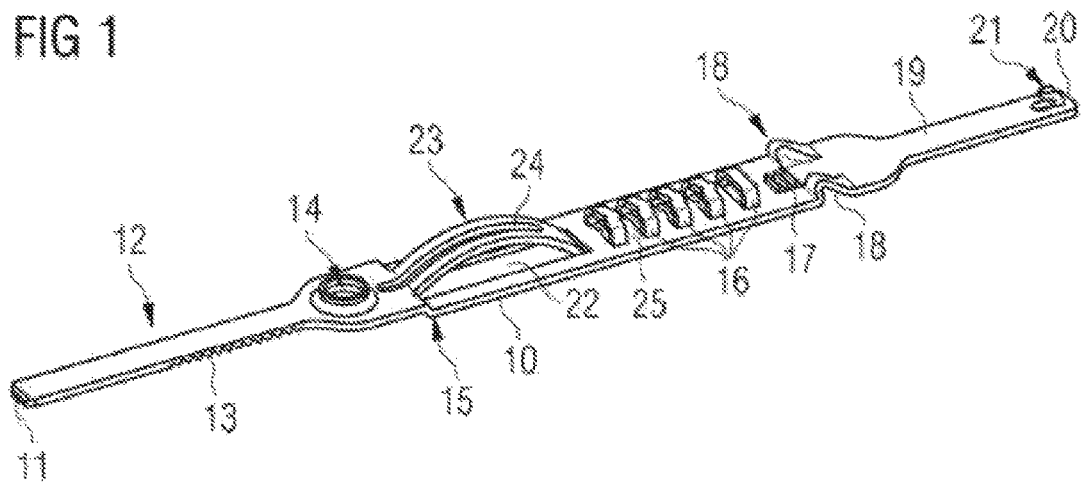
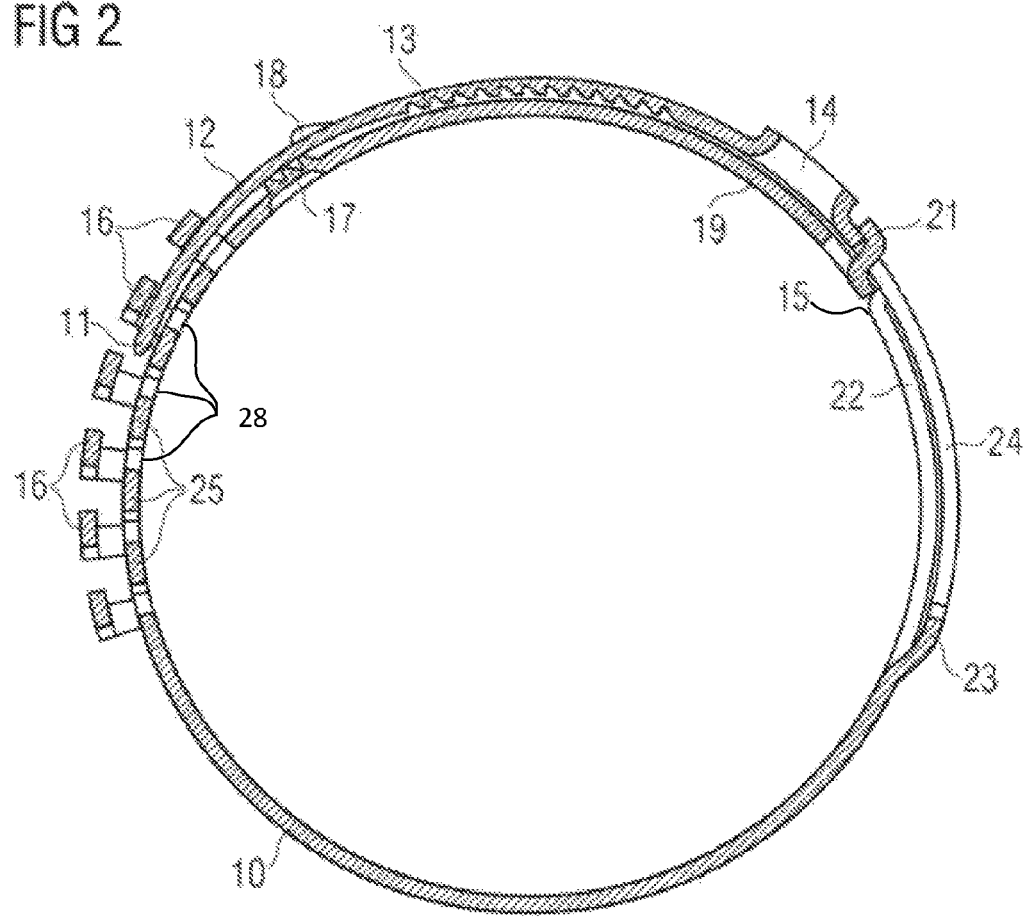

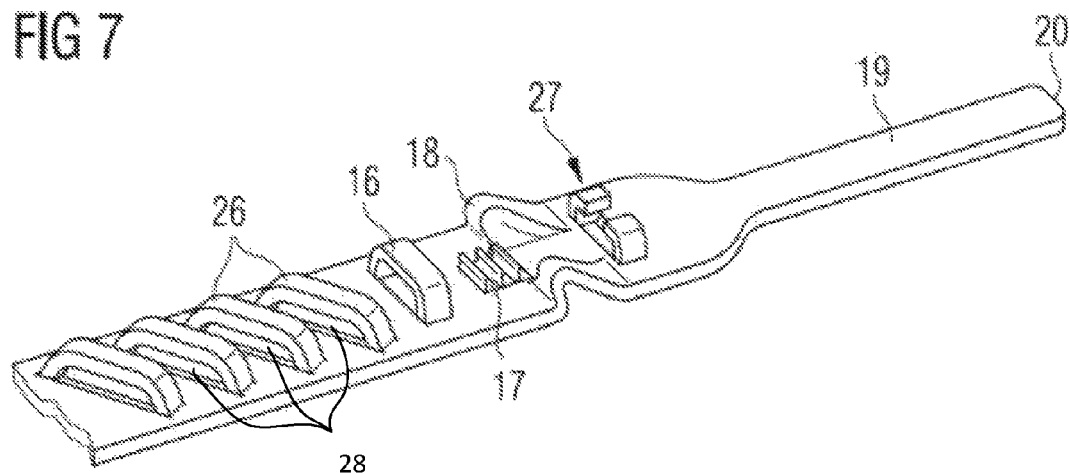
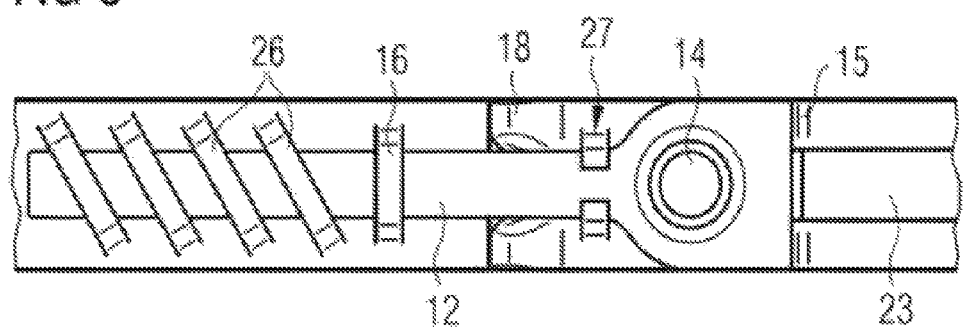

HOSE CLAMP

PRIORITY CLAIM

This patent application is a U.S. National Phase of International Patent Application No. PCT/EP2015/050152, filed 7 Jan. 2015, which claims priority to European Patent Application No. 14157331.1, filed 28 Feb. 2014, the disclosures of which are incorporated herein by reference in their entirety.

SUMMARY

Disclosed embodiments avoid, at least in part, disadvantages that occur with comparable prior art hose clamps. More specifically, disclosed embodiments provide a hose clamp in which buckling of the tongue is avoided and which can be realized with smaller diameters and greater tightening lengths.

In the disclosed hose clamp, the inner side of a tongue provided on the outer clamping band portion has at least one inward facing projection which cooperates with at least one outward facing projection provided on the inner clamping band portion, and the inner clamping band portion has a retaining structure at least partly surrounding the tongue. The mutually engaging projections, which are maintained positively in engagement, prevent any backlash after tightening thereby avoiding a loss of tightening force. A plurality of retainers which are closed on their outer sides are provided on the inner clamping band portion for the outer tongue. The windows cut out of the clamping band are made small by enlarging the remaining material webs, thereby reducing the chance for soft hose material to ooze out and become damaged.

BRIEF DESCRIPTION OF THE DRAWINGS

Disclosed embodiments will be explained in detail below with reference to the drawings, in which:

FIG. 1 is a perspective representation of a hose clamp in the straight condition;

FIG. 2 is an axial section of the hose clamp of FIG. 1 in the closed, non-tightened condition;

FIG. 7 shows another portion of the shaped hose clamp in the straight condition; and FIG. 8 shows another portion of the shaped hose clamps in the straight condition.

DETAILED DESCRIPTION OF THE DISCLOSED EMBODIMENTS

Figure 3:
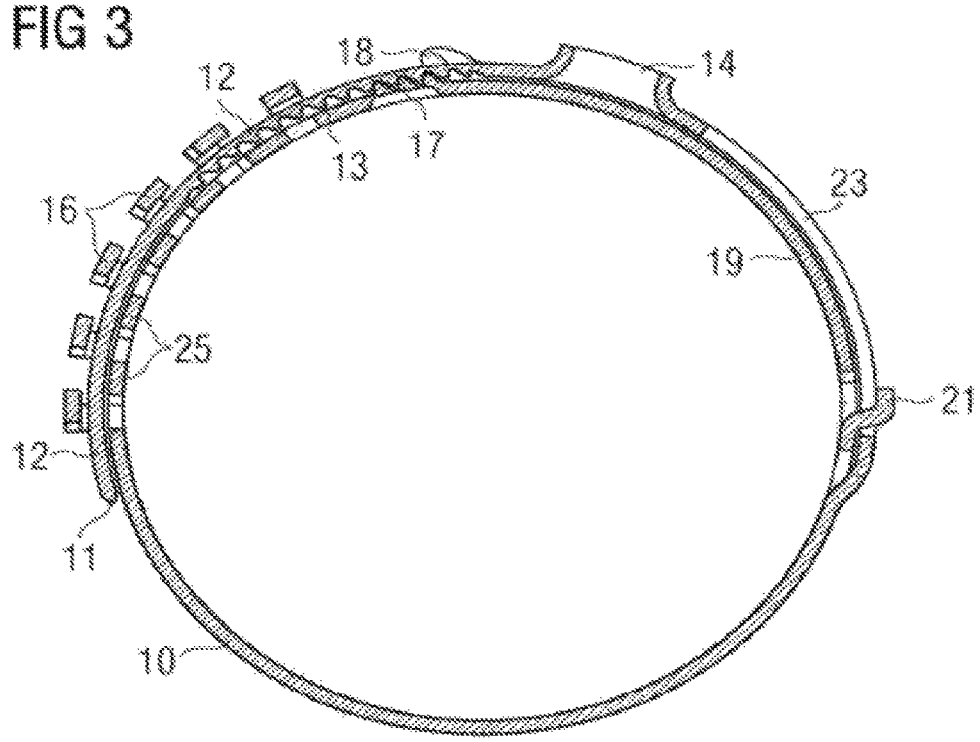
FIG. 3 is an axial section of the hose clamp of FIGS. 1 and 2 in the closed and tightened condition.

WO 2013/060346 A discloses a hose clamp made of a clamping band the ends of which overlap one another in the closed condition of the clamp thereby forming an inner and an outer clamping band portion, wherein one of the clamping band portions has its end terminating in a tongue which has a width reduced with respect to that of the main portion of the clamping band, and the tongue carries at least one projection that cooperates with at least one projection provided at the other clamping band portion for tightening the clamp. There is an ear-like tightening structure for tightening the clamp about an object to be clamped. The clamp is held in the tightened condition by engagement between an outer toothing provided on the inner clamping band portion and an inner toothing provided on the outer clamping band. In a disclosed embodiment, the outer toothing is formed on a tongue which is connected to the end of the inner clamping band portion and has a width smaller than the body of the clamping band.

U.S. Pat. No. 4,053,965 discloses an open hose clamp in which the end portions of the clamping band are provided with toothed regions for mutual engagement in the overlapping condition. A clip, which is not explained in detail, serves to maintain the end portions in mutual engagement. Such a clip is known from U.S. Pat. No. 3,078,532. U.S. Pat. No. 1,804,725 discloses another hose clamp in which a first toothed region provided on the outer side of a tongue cooperates with a second toothed region formed on the inner side of a projecting portion. During installation, these hose clamps which use engaging teeth are tightened by pulling on the free outer end of the clamping band.

Hose clamps which have the features recited in the preamble of claim 1 are known from DE 72 100 34 and U.S. Pat. No. 3,293,709. For tightening these hose clamps, smaller frictional forces have to be overcome than with the above mentioned hose clamps with an inner, toothed tongue. Further, the tightening action takes place on the side of the clamp remote from the object to be clamped and is therefore largely independent therefrom. This also reduced the danger of damage to the object to be clamped.

Disclosed embodiments avoid, at least in part, disadvantages that occur with comparable prior art hose clamps. More specifically, disclosed embodiments provide a hose clamp in which buckling of the tongue is avoided and which can be realized with smaller diameters and greater tightening lengths.

In the disclosed hose clamp, the inner side of a tongue provided on the outer clamping band portion has at least one inward facing projection which cooperates with at least one outward facing projection provided on the inner clamping band portion, and the inner clamping band portion has a retaining structure at least partly surrounding the tongue. The mutually engaging projections, which are maintained positively in engagement, prevent any backlash after tightening thereby avoiding a loss of tightening force. A plurality of retainers which are closed on their outer sides are provided on the inner clamping band portion for the outer tongue. The windows cut out of the clamping band are made small by enlarging the remaining material webs, thereby reducing the chance for soft hose material to ooze out and become damaged.

Optionally, at least one of the projections is formed as a series of teeth, so that the hose clamp may be tightened to different diameters and can compensate tolerances in the object to be clamped.

Forming the retainers, in accordance with a disclosed embodiment of the hose clamp, so that they extend at an angle with respect to the longitudinal direction the clamping band will result in the tongue being guided continuously in the circumferential direction.

Optionally, each of the inner and outer clamping band portions has a formation for engagement by a plier-type tightening tool, wherein the formation on the inner clamping band portion is disposed close to the outward projection and has a pair of hooks disposed on either side of the tongue. The tightening force is thus applied in the immediate vicinity of those elements which keep the hose clamp in the tightened condition.

For further guidance of the tongue, another retaining structure can be provided on the side of the hooks facing the inner clamping band end.

In a further disclosed embodiment, the end of the inner clamping band has an inner tongue of a width reduced with respect to the main portion of the clamping band, wherein a step corresponding to the thickness of the inner tongue and having a cut-out for the tongue to pass through is formed in the outer clamping band portion.

The region of the clamping band adjacent to the step may have a window corresponding to the width of the inner tongue, the window being covered by the remaining material strip of the clamping band. These measures make sure that the object to be clamped is uninterruptedly supported by the hose clamp.

The hose clamp may be delivered in the close condition. As a transportation safety device, the end of the inner tongue may have a hook for engaging the step in the non-tightened condition of the clamp.

In the following description, the terms "inner" and "outer" refer to the sides of the hose clamp which, in the closed condition, face toward and, respectively, away from the hose (object) to be clamped.

The hose clamp shown in FIGS. 1 to 5 consists of a clamping band 10 which, starting from the left, outer in end 11 in FIG. 1, has the following elements: an outer tongue 12 having a width smaller than the full width of the clamping band 10 and carrying on its inner side, which is the lower side in FIG. 1, a first toothed region 13, an outward open eye 14 stamped from the material of the clamping band at the beginning or the region of full clamping width, an inward projecting step 15 having a height corresponding to the thickness of the clamping band material, a plurality (six in the embodiment shown) of guide brackets 16 stamped from the clamping band material, a second, outward facing toothed region 17, two lateral retaining hook 18, and an inner tongue 19 which also has a width smaller than the full-width the clamping band and which carries near its end 20 an open securing hook 21 projecting outward and in the direction of the left end 11 of the clamping band 10.

In the closed, non-tightened condition shown in FIG. 2, in which the hose clamp is delivered by the manufacturer, the inner tongue 19 lies in a window 22 cut out partly of the clamping band 10 and starting at a step 15. The clamping band material cut out of the window 22 is pre-bent in accordance with the curvature of the closed clamp and forms a covering 23 which has its end connected to the full-width the clamping band and the prevents the inner tongue 19 form escaping outward. In the closed, non-tightened condition shown in FIG. 2. The securing hook 21 extends through a circumferential slot 24 formed in the covering 23 and engages the outer clamping band portion near the eye 14.

As shown in FIG. 2, the outer tongue 12 extends between the lateral retaining hooks 18, traverses the second toothed region 17 and, in the non-tightened condition, passes through at least the guide bracket 16 farthest remote from the outer clamping band end 11 and, as shown in FIG. 2, also through the next guide bracket. The outer tongue 12 is thus retained close to the inner clamping band portion.

Figure 4:
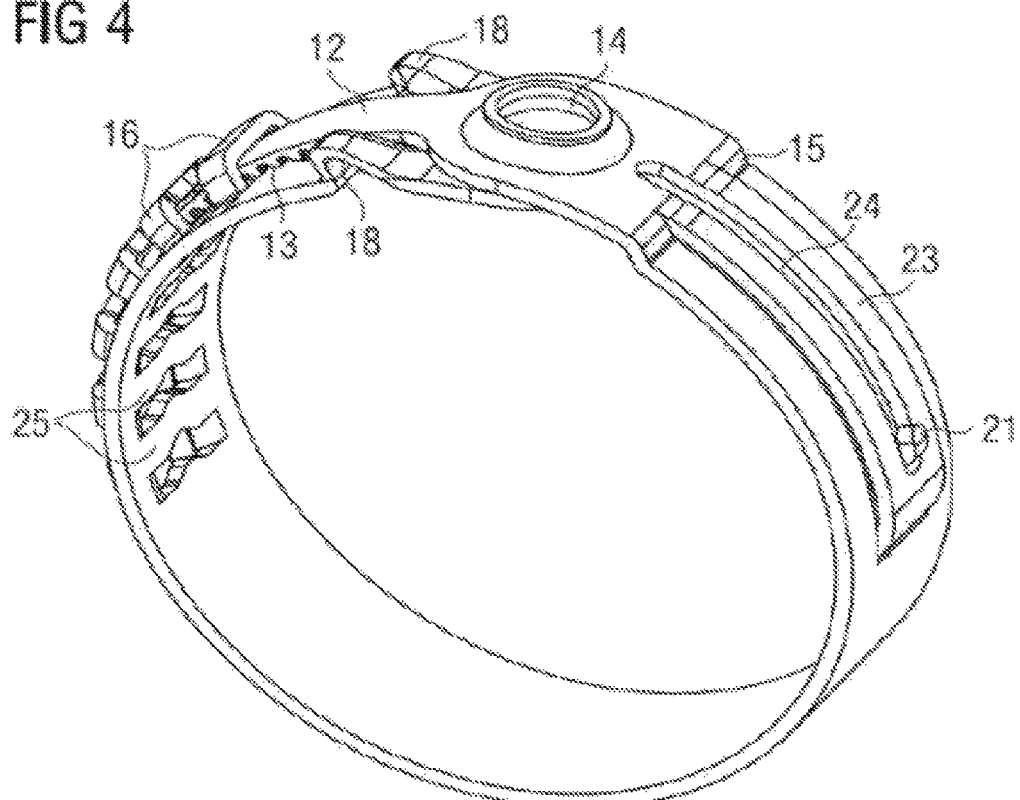
FIG. 4 is a first perspective representation of the hose clamp of FIGS. 1 to 3 in the closed, tightened condition.
Figure 5:
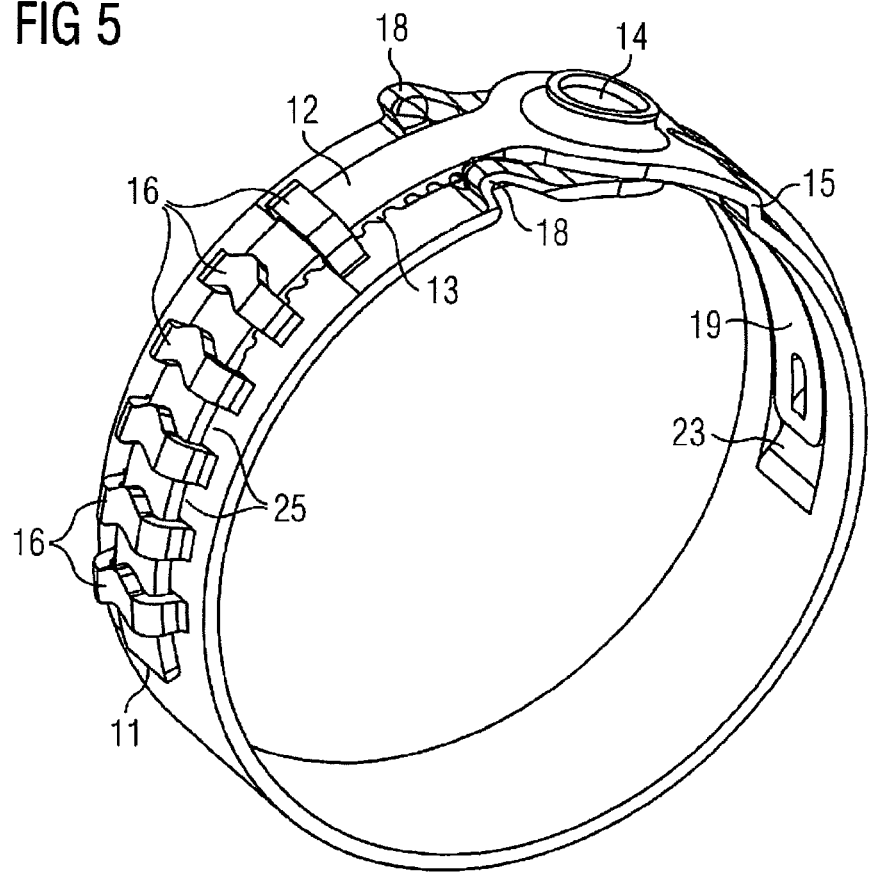
FIG. 5 is a second perspective representation of the hose clamp of FIGS. 1 to 3 in the closed, tightened condition.

Upon application on the object to be clamped (not shown), typically a hose placed on a pipe nipple, the hose clamp is narrowed by means of a plier-type tool engaging the eye 14 and the retaining hook 18 and is tightened about the object, wherein the outer tongue 12, as seen from FIGS. 3 to 5, moves further on the inner clamping band portion, guided by the guide brackets 16. The first toothed region 13 of the outer tongue 12 is thereby brought into engagement with the second toothed region 17 disposed between the retaining hook 18 and the guide brackets 16. In this engagement, the outer tongue 12 is held by the guide brackets 16.

During this tightening process of the hose clamp, the securing hook 21 is released from its engagement with the outer clamping band portion and slides along the slot 24 and the securing hook 21 acts to guide the inner tongue 19 in the circumferential direction of the hose clamp.

The guide brackets 16 are stamped from the clamping band. The webs 25 that remain between the guide brackets 16 are laterally embossed to reduce the gaps 28 in the clamping band and enlarge the support surface for the object to be clamped, to reduce any oozing of the object. This reduced the danger of damage to the object to be clamped.

The curved shape of the edges of the guide brackets 16 and webs 25, as particularly seen in FIGS. 1 and 5, improves the guiding of the outer tongue 12.

Figure 6:
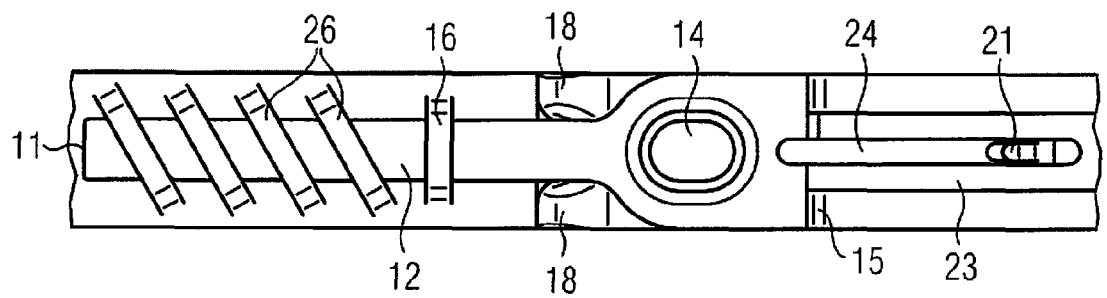
FIG. 6 shows a portion of the shaped hose clamp in the straight condition.

In the alternative disclosed embodiments shown in FIGS. 6 to 8, the guide brackets 26 extend at an angle to the axis of the hose clamp so that the outer tongue 12 is guided in the circumferential direction with practically no interruption.

The disclosed embodiment of FIGS. 7 and 8 differs from the one of FIGS. 1 to 5 in that a radially open retaining bracket 27 is provided on the side of the lateral retaining hook 18 remote from the outer clamping band end 11 to improve the engagement between the toothed regions 13 and 17 and improve the safety against external influences. In addition, the retaining hook has the function of a stop at the maximum tension of the hose clamp. It also simplifies the rounding process during manufacture.

The hose clamp described above has the following beneficial properties:

a) Small loss of force during tightening because, other than with so-called "ear clamps", there is no plastic deformation and, in contrast to an inner toothed tongue, smaller frictional forces have to be coped with.

b) Tolerance compensation due to different engaging positions between the toothed regions 13, 17, whereby different diameters of the tightened hose clamp are made possible.

c) Small chance of buckling of the outer, toothed tongue 12 due to the low-friction guiding of the tongue by means of the guide brackets 16, whereby the toothed function can be realized with a long tightening path even at small diameters.

d) Low structural height due to the element "eye" 14, which enables the tightening force to be applied substantially in the plane of the clamping band. If—in accordance with an alternative disclosed embodiment—the lateral retaining hooks 18 are replaced by a second eye similar to the eye 14, there is the benefit that the tightening tool is easier to align relative to the hose clamp.

e) Since no frictional forces occur underneath the toothed regions 13, 17, the tightening process is substantially independent from the properties of the object to be clamped.

f) Expansion forces occurring at the object to be tightened result in an improved locking between the toothed regions 13, 17.

g) The step 15 in connection with the covering 23 results in a uniform pressing of the hose clamp free of gaps over the entire circumference of the object to be clamped.

REFERENCE NUMBERS 10 clamping band
11 outer clamping band end 12 outer tongue
13 first toothed region
14 eye
15 step
16 guide bracket
17 second toothed region
18 retaining hook
19 inner tongue
20 inner clamping band end
21 securing hook
22 window
23 covering
24 slot
25 webs
26 guide bracket
27 retaining bracket
28 gaps

The invention claimed is:

1. A hose clamp comprising:
a clamping band having ends which overlap one another in a closed condition of the clamp thereby forming an inner and an outer clamping band portion,
wherein the outer clamping band portion terminates at one of the ends in a tongue which has a width reduced with respect to that of a main portion of the outer clamping band portion,
wherein the tongue carries on an inner side, at least one inward facing projection cooperating with at least one outward facing projection provided at the inner clamping band portion for tightening the clamp,
wherein the inner clamping band portion has retainers which are closed at their outer sides and surround the tongue at least in part, and
wherein the retainers are stamped from the material of the clamping band, and material webs left between adjacent ones of the retainers are enlarged in width thereby reducing gaps in the clamping band formed by the stamping so that the gaps are smaller than the retainers.

2. The hose clamp of claim 1, wherein the at least one inward facing projection comprises a plurality of inward facing teeth.

3. The hose clamp of claim 1, wherein the retainers extend at an angle to the longitudinal direction of the clamping band.

4. The hose clamp of claim 1, wherein each of the inner and outer clamping band portions has a formation for engagement by a tightening tool, and the formation on the inner clamping band portion is disposed adjacent to the at least one outward facing projection.

5. The hose clamp of claim 4, wherein the formation provided on the inner clamping band portion has a pair of hooks disposed on either side of the tongue.

6. The hose clamp of claim 5, wherein a further retaining structure for the tongue is provided on the side of the hooks facing the end that terminates the inner clamping band portion.

7. The hose clamp of claim 4, wherein the tightening tool comprises pliers.

8. The hose clamp of claim 1, wherein the end of the inner clamping band portion terminates in an inner tongue of a width reduced with respect to the main portion of the clamping band, and a step corresponding to the thickness of the inner tongue is formed in the outer clamping band portion.

9. The hose clamp of claim 8, wherein a region of the clamping band adjacent to the step has a window corresponding to the width of the inner tongue.

10. The hose clamp of claim 9, wherein the window is covered by a remaining material strip of the clamping band which extends along an arc having a curvature corresponding to that of the hose clamp when tightened.

* * * * *